United States Patent [19]
Adrian

[11] 3,958,241
[45] May 18, 1976

[54] CHAFF DISCRIMINATION SYSTEM
[75] Inventor: Donald J. Adrian, Arlington, Calif.
[73] Assignee: The United States of America as represented by the Secretary of the Navy, Washington, D.C.
[22] Filed: Nov. 2, 1961
[21] Appl. No.: 149,788

Related U.S. Application Data
[62] Division of Ser. No. 797,816, March 6, 1959, Pat. No. 3,918,059.

[52] U.S. Cl. ............................ 343/7 PF; 102/70.2 P
[51] Int. Cl.² ...................... F42C 13/04; G01S 9/02
[58] Field of Search ................... 343/5, 7, 13, 17.1, 343/14, 7 PF; 102/70.2 P

[56] References Cited
UNITED STATES PATENTS
| | | | |
|---|---|---|---|
| 2,421,012 | 5/1947 | Chew | 102/70.2 P |
| 3,131,388 | 4/1964 | Baker | 343/7 PF |
| 3,877,377 | 4/1975 | Rabinow | 102/70.2 P |

Primary Examiner—Malcolm F. Hubler
Attorney, Agent, or Firm—Richard S. Sciascia; Joseph M. St.Amand

EXEMPLARY CLAIM

1. A microwave radio fuze system for a missile having means for discriminating between a target and chaff comprising in combination, a pair of oppositely polarized transmitting antennas operably connected to a frequency modulated oscillator by a first switch means, a receiving antenna polarized in the same direction as one of said transmitting antennas, mixing means operably associated with said receiving antenna for mixing a portion of a transmitted signal with a received echo signal, amplifier means adapted to amplify said mixing means output, a pair of envelope detectors operably connected to said amplifying means by a second switch means, a difference amplifier adapted to receive the output from said pair of envelope detectors whereby a firing signal is provided by said difference amplifier when the output of a certain one of said detectors exceeds the output of said other detector, and means for controlling said first and second switch means whereby said pair of transmitting antennas and said pair of detectors are synchronously controlled.

1 Claim, 3 Drawing Figures

CHAFF DISCRIMINATION SYSTEM

The invention described herein may be manufactured and used by or for the Government of the United States of America for governmental purposes without the payment of any royalties thereon or therefor.

This is a division of U.S. Pat. application Ser. No. 797,816, filed Mar. 6, 1959, now U.S. Pat. No. 3,918,059.

This invention relates to a chaff discrimination system for a missile fuze and more particularly to a means for discriminating between a target and chaff by utilizing the difference in polarization properties of the echoes in a radio fuze system.

One of the most common countermeasures used by target aircraft to prematurely fire the radio fuze of a missile is to dispense a plurality of small metallic particles, commonly known as chaff, which will reflect the transmitted carrier wave in the same manner as the target. For missiles that are air-launched and normally are steered to the rear of the target aircraft in a tail chase, the chaff is dispensed rearwardly from the target aircraft, while the head-on attacks by surface-launched missiles the chaff cloud is provided by a forward fired chaff-dispensing rocket launched from the target.

The present invention involves the difference in polarization of the microwave signal reflected from a target and chaff. When chaff is illuminated with radiation by a transmitted microwave of any one of the common radio fuze systems employed in missiles and the radiation has for example, vertical polarization only, there is both a horizontal and vertical polarization in the return echo signal from the chaff. On the other hand, if simple metal surfaces common to the extremities of most modern airplanes or missiles where fuzes usually function such as a plane, a cylinder or a sphere are illuminated with vertically polarized radiation, the reflected echo signal consists of radiation having vertical polarization.

The present invention consists essentially of a bias channel identical with the fuze receiver channel of a typical microwave radio fuze system such as the system disclosed by Whitely and Adrian in their application Ser. No. 566,318 filed Feb. 17, 1956 and entitled Random FM Autocorrelation Fuze System or the Noise Modulated Fuze System of Adrian Ser. No. 761,447 filed Sept. 16, 1958. The transmitted carrier wave of such systems will have a single polarization pattern of, say horizontal whereby the reflected target echo will have only a horizontal component and is thus received, amplified and detected by the fuze receiver channel. If the detected signal is of sufficient amplitude, the fuze firing circuit will be actuated. The bias channel of the instant invention has a receiving antenna of, say vertical polarization whereby the reflected signal from chaff which has both a horizontal and vertical polarization component will be received, mixed with the transmitted signal, amplified, detected and fed to the firing circuit to bias the firing signal from the fuze receiver channel when the vertical components from the chaff is of sufficient magnitude to balance out the horizontal component detected by the fuze receiver channel.

It is an object of the invention therefore, to provide a positive means for a fuze system to discriminate between a target aircraft and chaff.

Another object of the invention is to provide an improved counter-countermeasure device for a radio fuze system of a missile.

A still further object of the invention to provide a means for preventing the firing of a missile fuze system when chaff is detected.

A further object of the invention is to provide a means for detecting the polarization components of a reflected radio signal to distinguish a target signal from a countermeasure signal.

Other objects and many of the attendant advantages of this invention will be readily appreciated as the same becomes better understood by reference to the following detailed description when considered in connection with the accompanying drawings wherein.

Figure 1:
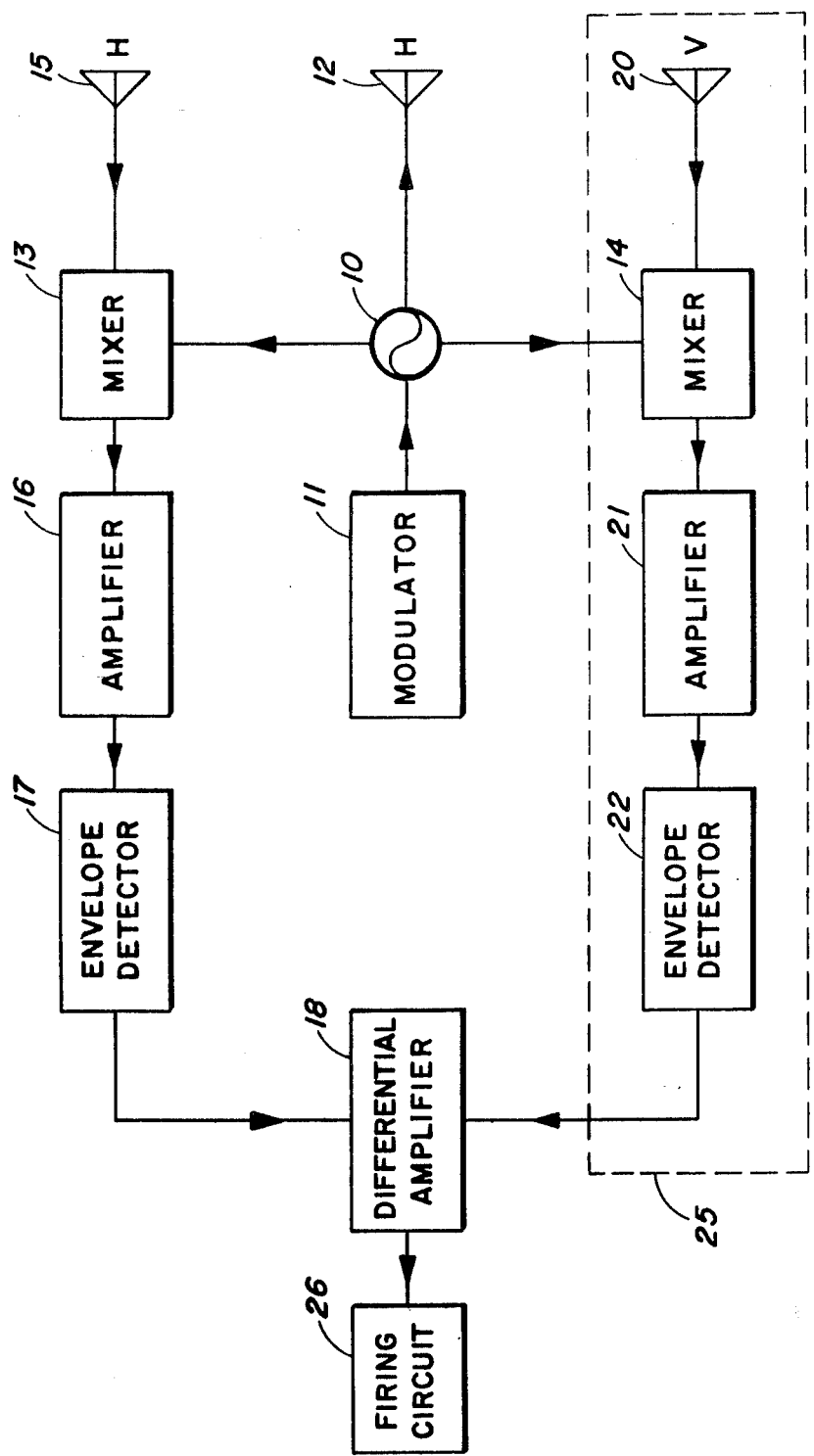
FIG. 1 is a block diagram illustrating one preferred embodiment of the invention.

Referring to the drawings and with particular reference to FIG. 1 this embodiment comprises a transmitter 10 which has its carrier modulated by any common modulator 11 employed in microwave fuze systems, such as frequency modulation by white noise or a periodic wave. The signal is radiated in the direction of the target by a horizontally polarized antenna 12. A portion of the transmitted RF signal is also applied to each of the balanced mixers 13 and 14 where it is combined in the mixer 13 with the return signal from the target aircraft which has been modified by the Doppler effect due to the relative movement between the missile and aircraft and is received through the horizontally polarized antenna 15 and applied to the mixer 13.

The output from the mixer 13 is passed through a band pass amplifier 16 which is usually designed to pass a band of expected Doppler frequencies which in turn are passed through a detector 17. The output of the detector 17 is the envelope of the band pass amplifier output and is fed directly to the differential amplifier 18 to fire the fuze as hereinafter described. The system just described is a typical radio fuze system of a missile and is assumed to be mounted in a moving missile (not shown) which is guided in a path to approach a target with the RF energy from the fuze being transmitted toward the target with a return echo signal being received therefrom. The transmitted carrier from the transmitter 10 need not be modulated but could be non-modulated carrier signal from the horizontally polarized antenna 12.

The bias channel, which can be added to many of the known radio fuze systems and is shown in the dashed line portion 25 of FIG. 1, comprises the mixer 14 which combines a portion of the transmitted signal with a return echo signal from chaff when encountered that has a vertical polarization component and is received by the vertically polarized antenna 20. The bias channel is the same as the receiver channel 13–17 of the fuze system described above in that the output from the mixer 14 is passed through a band pass amplifier 21 which is set to pass a band of expected Doppler frequencies. The output from the amplifier 21 is detected by the envelope detector 22 and the envelope of the detected signals is applied to the differential amplifier 18 to cancel the signal from 17 and thus prevent a positive signal from being fed to the firing circuit 26.

Figure 2:
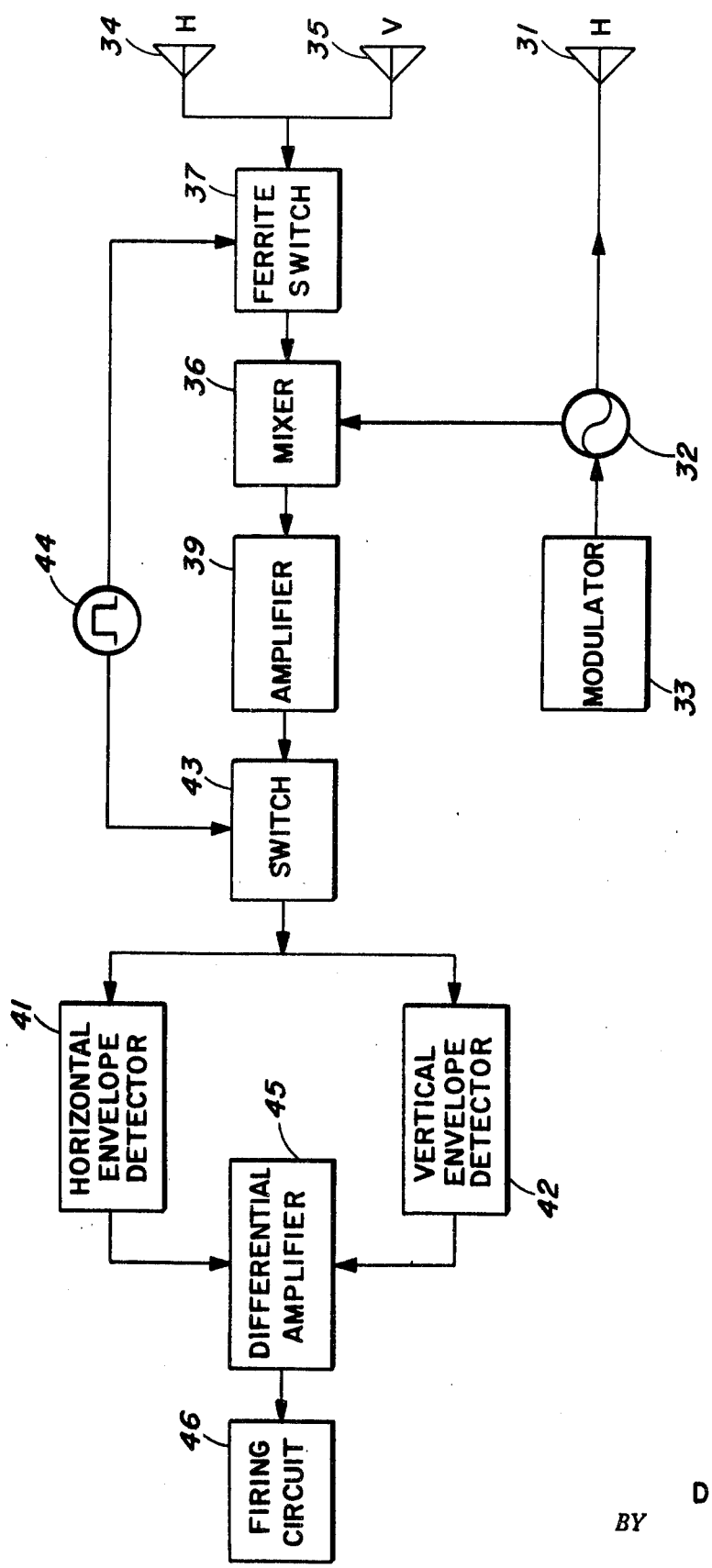
FIG. 2 is a block diagram illustrating a second preferred embodiment of the invention.
Figure 3:
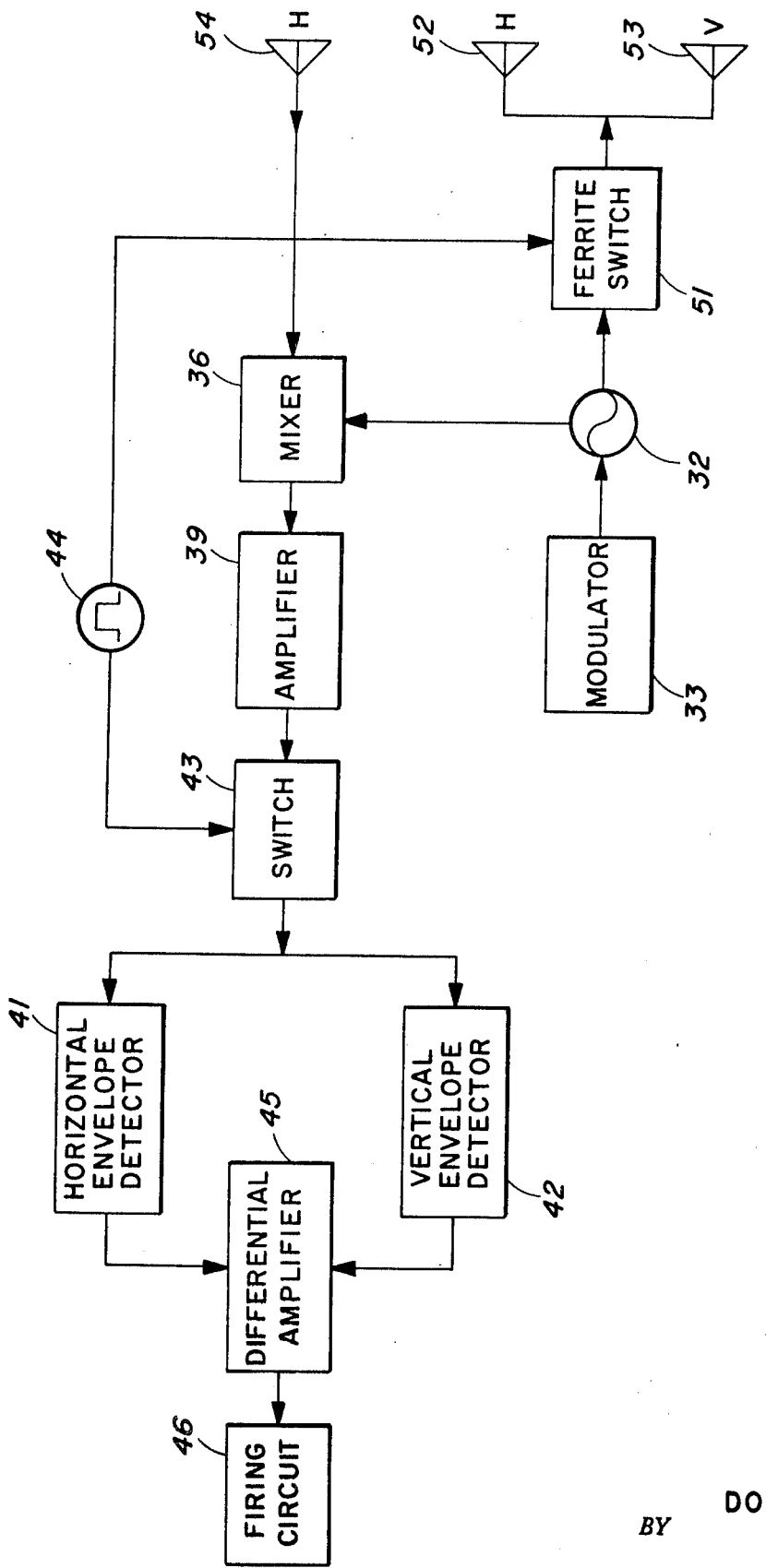
FIG. 3 is a block diagram illustrating a third preferred embodiment of the invention.

In the embodiments of the invention shown in FIGS. 2 and 3 only one mixer and one amplifier are necessary to mix and amplify return echo signals from either a target or chaff. FIG. 2 illustrates a system wherein one transmitting antenna 31 is horizontally polarized to transmit the carrier signal from the oscillator 32 that is frequency modulated by either a band of white noise or a periodic wave from the modulator 33.

The receiving antenna array comprises at least one horizontally polarized antenna 34 and one vertically polarized antenna 35. The return echo signal received by the antennas 34 and 35 are passed on to the mixer 36 through a ferrite switch 37 which alternately connects the antennas 34 and 35 with the mixer 36. The return echo signal passed to the mixer is mixed with a portion of the transmitted signal and fed to the band pass amplifier 39 which is set to pass a band of expected Doppler frequencies to either of the envelope detectors 44 or 42 depending upon the position of the switch 43. The switch 43 and the ferrite switch 37 are actuated by a square wave generator 44 whereby the output from the amplifier 39 is passed to the horizontal envelope detector 41 whenever the horizontal polarized receiving antenna 32 is connected to the mixer 36 and likewise the output from the amplifier 39 is passed to the vertical envelope detector 42 whenever the vertically polarized antenna 35 is connected to the mixer 36. The output from the horizontal and vertical envelope detectors 41 and 42 are applied to a difference amplifier 45 to produce a signal from the difference amplifier 45 to the firing circuit 46 only when a target is encountered.

In operation of the embodiment shown in FIG. 2 the transmitted signal from the antenna 31 is horizontally polarized whereby a signal reflected from a target surface will have only a horizontal polarized component while a reflected signal from chaff will have both a horizontal and vertical component. The receiving antennas 34 and 35 are alternately connected to the mixer 36 whereby a reflected signal from a target surface would result in an output from the horizontal envelope detector 41 and none from the vertical polarized signal. The difference amplifier 45 is designed to produce a firing signal for the firing circuit 46 whenever the amplitude of the horizontal envelope is greater than the vertical envelope detected from the amplifier 39 output whereby a firing signal occurs when the return target echo signal is received since there is no vertical component to cancel out the horizontal component.

When a return echo is received from chaff it will comprise both horizontal and vertical polarized components and the energy output from the envelope detectors 41 and 42 will be equal in amplitude and will not produce a firing signal from the difference amplifier 45. In order to insure that no firing signal is produced by the difference amplifier 45 the gain of the detector 42 is normally greater than the detector 41 whereby the energy level of the vertical envelope will always be equal to or greater than the horizontal envelope.

The embodiment shown in FIG. 3 is the same as the embodiment shown in FIG. 2 except ferrite switch 51 is provided to alternately switch the output from the oscillator 32 to a horizontally polarized transmitting antenna 52 and a vertically polarized transmitting antenna 53. Also a horizontally polarized receiving antenna 54 receives the return echo signal and applies it to the mixer 36, and square wave output from the oscillator 44 is applied to synchronously switch the ferrite switch 51 and switch 43.

In operation of the embodiment shown in FIG. 3 the switches 43 and 51 are synchronized so that the amplifier 39 output is connected to the horizontal envelope detector 41 at the same time that the horizontally polarized signal is transmitted from the antenna 52 and the output from amplifier 39 is applied to the vertical envelope detector 42 when a vertically polarized signal is transmitted from the antenna 53. The relationship of the detectors 41, 42 and the difference amplifier 45 is the same as in the embodiment of FIG. 2 wherein a firing signal is produced by the differential amplifier 45 whenever the energy level of the envelope detected by the horizontal detector is greater than the energy level of the detector 42 output. Therefore, when a horizontally polarized signal is transmitted by antenna 52 a horizontally polarized signal will be received from a target aircraft and the switch 43 will connect the output from the amplifier 39 to the horizontal envelope detector. The vertically polarized signal from the antenna 53, reflected from the target and received by the antenna 54 will have a very small amount of energy, if any, passed by the antenna 54 to the circuit 36–42. Since there will be substantially no output from the detector 42 applied to the difference amplifier 45, a firing signal will be produced by the output of the detector 41 applied to the difference amplifier 45.

When chaff reflects the horizontal and vertical polarized transmitted signals there will be both a reflected horizontal and vertical component of equal magnitude and by raising the gain of the detector 42 above the gain of the detector 41 the output from detector 42 will prevent the output detector 41 from producing a firing signal when the outputs are applied to the difference amplifier 45.

Although the above embodiments shown in FIGS. 1-3 are shown with fuze systems having a modulated transmitted signal it is to be understood that the invention can be used with unmodulated transmitted signals without varying from the scope of the invention. Also the systems shown can be used as a counter-countermeasure device where the enemy uses a circularly polarized signal for jamming a fuze or guidance system.

Obviously many modifications and variations of the present invention are possible in the light of the above teachings. It is therefore to be understood that within the scope of the appended claims the invention may be practiced otherwise than as specifically described.

What is claimed is:

1. A microwave radio fuze system for a missile having means for discriminating between a target and chaff comprising in combination, a pair of oppositely polarized transmitting antennas operably connected to a frequency modulated oscillator by a first switch means, a receiving antenna polarized in the same direction as one of said transmitting antennas, mixing means operably associated with said receiving antenna for mixing a portion of a transmitted signal with a received echo signal, amplifier means adapted to amplify said mixing means output, a pair of envelope detectors operably connected to said amplifying means by a second switch means, a difference amplifier adapted to receive the output from said pair of envelope detectors whereby a firing signal is provided by said difference amplifier when the output of a certain one of said detectors exceeds the output of said other detector, and means for controlling said first and second switch means whereby said pair of transmitting antennas and said pair of detectors are synchronously controlled.

* * * * *